US009615691B2

(12) United States Patent
Xiao

(10) Patent No.: US 9,615,691 B2
(45) Date of Patent: Apr. 11, 2017

(54) AIR FRYER

(71) Applicant: Shaoji Yan, Foshan, Guangdong (CN)

(72) Inventor: Xueyu Xiao, Guangdong (CN)

(73) Assignee: Shaoji Yan, Foshan (CN)

( * ) Notice: Subject to any disclaimer, the term of this patent is extended or adjusted under 35 U.S.C. 154(b) by 0 days.

(21) Appl. No.: 14/961,854

(22) Filed: Dec. 7, 2015

(65) Prior Publication Data

US 2016/0174764 A1 Jun. 23, 2016

(30) Foreign Application Priority Data

Dec. 18, 2014 (CN) .......................... 2014 1 0802286

(51) Int. Cl.
A47J 37/10 (2006.01)
A47J 37/06 (2006.01)
A47J 37/12 (2006.01)

(52) U.S. Cl.
CPC ....... A47J 37/0641 (2013.01); A47J 37/1209 (2013.01)

(58) Field of Classification Search
CPC .............. A47J 37/0629; A47J 37/0641; A47J 37/1209; F24C 15/322
USPC ........... 99/339, 345, 348, 357, 447; 426/423
See application file for complete search history.

(56) References Cited

U.S. PATENT DOCUMENTS

| 4,397,875 | A | * | 8/1983 | Gilliom | .................. | A23L 3/365 |
| | | | | | | 426/523 |
| 2003/0062360 | A1 | * | 4/2003 | Moon | ................. | A47J 37/0623 |
| | | | | | | 219/481 |
| 2005/0223906 | A1 | * | 10/2005 | Xu | ........................ | A47J 27/004 |
| | | | | | | 99/348 |
| 2009/0134140 | A1 | * | 5/2009 | Van Der Weij | ..... | A47J 37/0623 |
| | | | | | | 219/400 |
| 2013/0180413 | A1 | * | 7/2013 | Tjerkgaast | .......... | A47J 37/0641 |
| | | | | | | 99/447 |
| 2014/0083992 | A1 | * | 3/2014 | Linnewiel | .......... | A47J 37/0641 |
| | | | | | | 219/400 |
| 2016/0100713 | A1 | * | 4/2016 | De Haas | ............. | A47J 37/0641 |
| | | | | | | 426/523 |

FOREIGN PATENT DOCUMENTS

| CN | 102165266 B | 4/2013 |
| CN | 103767562 A | 5/2014 |
| CN | 203776728 U | 8/2014 |

* cited by examiner

Primary Examiner — Dana Ross
Assistant Examiner — Lindsey C. Staubach

(57) ABSTRACT

The present invention relates to manufacturing of kitchen appliances, and particularly to air fryer, comprising fryer body, liner, frying basket provided within the liner, electrical heating tube arranged above the frying basket and fan located above the heating tube. Side wall of the frying basket is thin plate and bottom of the frying basket is grid. Air channel is provided between the liner and the frying basket. Swirl guide cylinder is provided externally at the bottom of the frying basket and is connected with the side wall of the frying basket. Air inlets for forming rotary air flow are opened on the bottom of the swirl guide cylinder. The air inlets divert the air flow in a same direction and form a swirl. With such configuration, the frying basket is simple in structure, the liner is easy to manufacture and clean, and the frying basket is better supported.

4 Claims, 2 Drawing Sheets

AIR FRYER

CROSS-REFERENCE TO RELATED APPLICATION

The present application claims the benefit of Chinese Patent Application No. 201410802286.5 filed on Dec. 18, 2014, the contents of which are hereby incorporated by reference.

FIELD OF THE INVENTION

The present invention relates to the field of manufacturing kitchen appliances for home, and particularly to a fryer for preparing food utilizing both electrical heating radiation and heated air.

BACKGROUND OF THE INVENTION

As shown in FIG. 1, in a known air fryer, an air guide is often provided protruding from the inner bottom surface of the fryer body. An air fryer is known from the Chinese Patent ZL200880131179.7, where a food preparation chamber is provided in a fryer body 1, a liner 2 is disposed on the bottom of the food preparation chamber of the fryer body 1, a frying basket 3 is provided within the liner 2, an electrical heating tube 4 is arranged above the frying basket 3 and a fan 5 is further located above the heating tube 4. The side wall of the frying basket is a planar plate 30, and the bottom of the frying basket is a grid 31. An air channel 6 is provided between the liner 2 and the frying basket 3, the center of the bottom of the air channel being provided with at least one air guide 9 having a complex concave and convex configuration. With this type of air fryer having the above structure, although air is guided to converge upwards so that food within the frying basket 3 can be heated uniformly, the air guide of the liner having the complex concave and convex configuration is difficult and expensive to manufacture, and is also troublesome when cleaning of the fryer bottom is performed.

SUMMARY OF THE INVENTION

The object of the present invention is to overcome the disadvantages of the existing air fryer. To this end, the present invention provides an air fryer having an air guide which is simple in structure and easy to manufacture and which facilitates cleaning of the fryer bottom.

An aspect of the present invention provides an air fryer, comprising a fryer body (1), a liner (2), a frying basket (3) provided within the liner (2), an electrical heating tube (4) arranged above the frying basket (3) and a fan (5) located above the heating tube (4), wherein a side wall of the frying basket (3) is a thin plate and a bottom of the frying basket is a grid, and wherein an air channel (6) is provided between the liner (2) and the frying basket (3), characterized in that, a swirl guide cylinder is provided externally at the bottom of the frying basket (3) and is connected with the side wall of the frying basket, and air inlets (8) arranged evenly in a same direction and oriented clockwise or counter-clockwise are opened on the bottom plate (7) of the swirl guide cylinder; one side of the air inlets (8) being bent in a direction in which air flows to form guide plates, thus diverting the air flow in a same direction and forming a swirl.

The bottom plate (7) of the swirl guide cylinder is connected with the side wall of the frying basket (3) via a connecting wall (70).

The bottom plate (7) of the swirl guide cylinder is connected hermetically with the side wall of the frying basket (3) via the connecting wall (70), and supporting pillars (71) are arranged downward from the connecting wall (70) and are supported on a bottom wall of the liner (2).

Another air inlet (72) is arranged in the center of the bottom plate (7) of the swirl guide cylinder.

The advantage of the present invention can be attributed to the swirl guide cylinder is provided at the bottom of the frying basket and the air inlets evenly opened on the bottom of the swirl guide cylinder for forming swirl of air flow. With this arrangement, it is not necessary to provide an air guide having a complex configuration on the liner, thus simplifying the structural design and manufacturing process of the liner and facilitating cleaning operation of the bottom thereof. The slit-shaped and unidirectional air inlets, evenly opened on the bottom plate of the swirl guide cylinder in a rotationally radial configuration, form rotary flow of air. With the help of the suction force generated by the fan located above, air flow which flows upward through the bottom of the frying basket converges at the center more forcefully, so that food within the frying basket is evenly heated from bottom to top.

DETAILED DESCRIPTION OF SHOWN EMBODIMENTS

Embodiments of the air fryer according to the present invention will be described in detail below.

Figure 1:
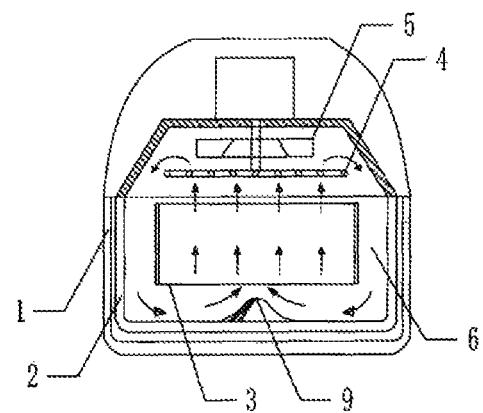
FIG. 1 is a schematic illustration of an existing air fryer.
Figure 2:
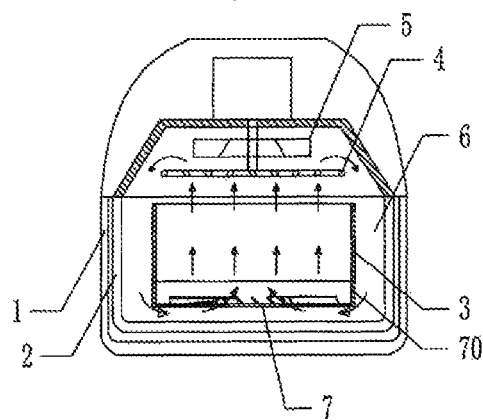
FIG. 2 is a schematic illustration of the air fryer according to a first embodiment of the present invention.
Figure 3:
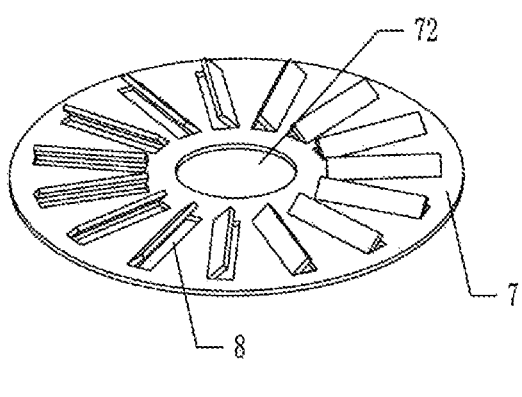
FIG. 3 is a perspective view of the bottom plate of the swirl guide cylinder.

Reference is now made to a first embodiment of the present invention. As shown in FIGS. 2 and 3, the air fryer according to this embodiment has a fryer body 1, a liner 2 which acts as a food preparation chamber is disposed within the fryer body, a frying basket 3 which carry the food to be prepared is provided in the liner 2, an electrical heating tube 4 is arranged above the frying basket 3 and a fan 5 is further located above the heating tube 4. The side wall of the frying basket 3 is a thin plate, and the bottom of the frying basket is a grid. An air channel 6 is provided between the liner 2 and the frying basket 3. In order to increase the flow rate of the air, a swirl guide cylinder is provided externally at the bottom of the frying basket 3 connected with the side wall of the frying basket 3. Slit-shaped and unidirectional air inlets 8 are evenly opened on the bottom plate 7 of the swirl guide cylinder, which is arranged in a rotationally radial configuration and used to form rotary flow of air. The air inlets 8 are formed by punching slots on the thin metal plate which is bottom plate and bending one side in a direction in which air flows to form guide plates, and guide the intake air into rotary flow. The overall flow area of inlets on the guide cylinder is less than the flow area of the air channel 6, so that flow rate of air which flows through the inlets is accelerated. Generally, gaps in food are smaller at the center of the frying basket 3, leading to slow preparation process. In this regard, in this embodiment, with the help of the suction force generated by the fan located above, air flow which flows upward through the bottom of the frying basket 3 converges at the center more forcefully, so that food within the frying basket is evenly heated from bottom to top. A circular air inlet 72 is opened additionally in the center of the bottom plate 7 of the guide cylinder, which would increase air volume that flows through the central part of the bottom of the frying basket 3, resulting more sufficient heating of food located in the central part of bottom of the frying basket 3. The bottom plate 7 of the swirl guide cylinder may be connected with the side wall of the frying basket 3 via a connecting wall 70, and the bottom plate 7 of the swirl guide cylinder is spaced apart from the bottom of the liner 2 at an appropriate distance. The liner 2 is free of a concave and convex configuration and instead is planar and smooth, and thus is easier to clean.

Figure 4:
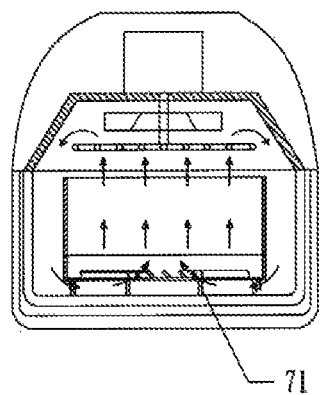
FIG. 4 is a schematic illustration of the air fryer according to a second embodiment of the present invention.

Reference is now made to a second embodiment of the present invention. As shown in FIG. 4, the air fryer of this embodiment is substantially the same as that of the first embodiment except that, in this embodiment, the bottom plate 7 of the swirl guide cylinder is movably connected with the side wall of the frying basket 3 via a connecting wall 70, and supporting pillars 71 are arranged downward from the connecting wall 70 and are supported on the bottom wall of the liner 2. This structural design may improve stability of the frying basket 3. The frying basket 3 is no longer merely supported at one point by suspension via a shank, so that the tendency to deformation of the frying basket 3 caused by uneven force distribution due to support at one point by suspension.

A further benefit is that, the side wall of the guide cylinder extends upward to some extent to form movable sleeved with the frying basket 3, so the side wall and the bottom wall of the frying basket 3 may integrally formed by a metal grid. Therefore, the overall weight of the frying basket 3 is notably decreased, and thus the fryer may be handled more conveniently with less effort.

What is claimed is:

1. An air fryer, comprising a fryer body (1), a liner (2), a frying basket (3) provided within the liner (2), an electrical heating tube (4) arranged above the frying basket (3) and a fan (5) located above the heating tube (4), wherein a side wall of the frying basket (3) is a thin plate and a bottom of the frying basket is a grid, and wherein an air channel (6) is provided between the liner (2) and the frying basket (3), characterized in that, a swirl guide cylinder is provided externally at the bottom of the frying basket (3) and is connected with the side wall of the frying basket, and air inlets (8) arranged evenly in a same direction and oriented clockwise or counter-clockwise are opened on a bottom plate (7) of the swirl guide cylinder; wherein the air inlets (8) are through holes in the cylinder; one side of the air inlets (8) being bent in a direction in which air flows to form guide plates, thus diverting the air flow in a same direction and forming a swirl; the bottom plate (7) of the swirl guide cylinder is connected with the side wall of the frying basket (3) via a connecting wall (70); and the overall flow area of the air inlets (8) on the guide cylinder is less than the flow area of the air channel (6).

2. The air fryer according to claim 1, characterized in that, the bottom plate (7) of the swirl guide cylinder is connected hermetically with the side wall of the frying basket (3) via the connecting wall (70), and supporting pillars (71) are arranged downward from the connecting wall (70) and are supported on a bottom wall of the liner (2).

3. The air fryer according to claim 2, characterized in that, another air inlet (72) is arranged in the center of the bottom plate (7) of the swirl guide cylinder.

4. The air fryer according to claim 1, characterized in that, another air inlet (72) is arranged in the center of the bottom plate (7) of the swirl guide cylinder.

* * * * *